United States Patent [19]

Nehls

[11] Patent Number: 4,809,121

[45] Date of Patent: Feb. 28, 1989

[54] CIRCUIT ARRANGEMENT IN MOTOR VEHICLES

[75] Inventor: Wolfgang Nehls, Unterschleissheim, Fed. Rep. of Germany

[73] Assignee: Bayerische Motoren Werke Aktiengesellschaft, Munich, Fed. Rep. of Germany

[21] Appl. No.: 87,797

[22] Filed: Aug. 21, 1987

[30] Foreign Application Priority Data

Aug. 21, 1986 [DE] Fed. Rep. of Germany ....... 3628344

[51] Int. Cl.[4] ........................................ H02H 3/00

[52] U.S. Cl. ................................ 361/1; 307/10 R; 307/38; 307/141; 307/326; 340/54

[58] Field of Search .................... 361/1; 307/9, 10 R, 307/326, 328, 38, 141; 340/52 R, 52 F, 54

[56] References Cited

U.S. PATENT DOCUMENTS 4,013,875 3/1977 McGlynn .................... 340/52 F X
4,535,334 8/1985 Tagami et al. .................... 307/10 R
4,572,963 2/1986 Nakano et al. .................. 307/10 R
4,672,278 6/1987 Ingraham et al. ............ 307/10 R X

*Primary Examiner*—Derek S. Jennings
*Attorney, Agent, or Firm*—Barnes & Thornburg

[57] ABSTRACT

A circuit arrangement in motor vehicles with electrical adjusting members coordinated to equipment components, to which belongs individually a manually actuatable switch and a control unit which upon initiation thereof, energizes the adjusting member for the automatic displacement of the equipment component into an end position; the control units are thereby adapted to be de-energized during the time interval engagement of the adjusting member upon actuation of any switch even prior to reaching the end position. A frequently cumbersome locating of the associated individual switch, respectively, the correct actuation during the automatic movement of the equipment component is dispensed with thereby.

9 Claims, 1 Drawing Sheet

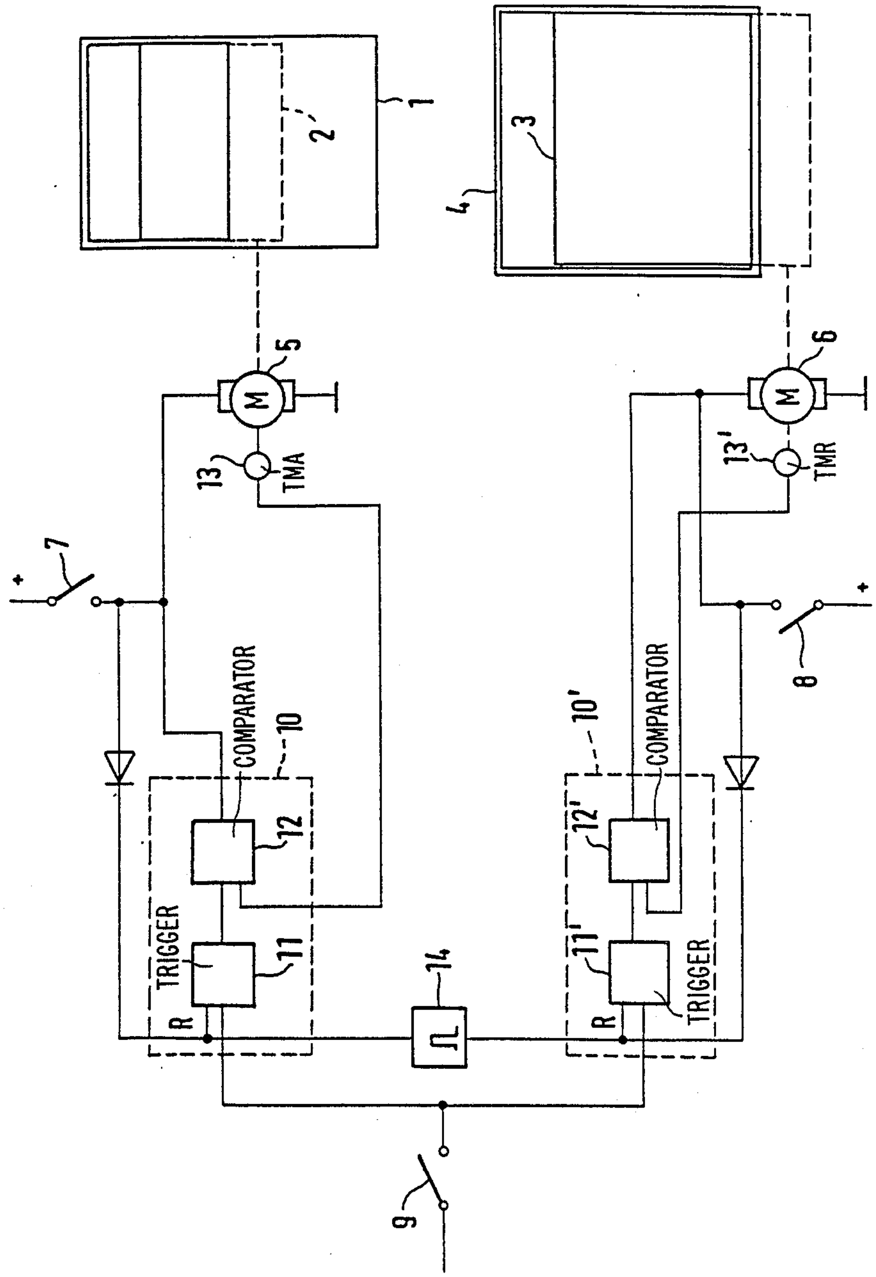
1
2'
3
4
5
6
M
M
13
TMA
13'
TMR
7
8
9
10
10'
COMPARATOR
COMPARATOR
12
12'
TRIGGER
TRIGGER
11
11'
R
R
14

CIRCUIT ARRANGEMENT IN MOTOR VEHICLES

BACKGROUND AND SUMMARY OF THE INVENTION

The present invention relates to a circuit arrangement in motor vehicles with electrical adjusting members coordinated to equipment components, to which belongs individually a manually actuatable switch and a control unit which upon initiation causes the adjusting member to automatically displace the equipment component into its end position.

Such circuit arrangements are generally used in motor vehicles. Equipment components which involve, for example, electrically adjustable seats, window lifters or sliding/lifting roofs are displaced with the assistance of the control units into their use position preadjustable individually by the respective vehicle user or into their end positions independent of the user. Several adjusting members of an equipment component or similar types of equipment components are displaced simultaneously upon a command at will. For example, the adjustment of the driver seat as regards backrest inclination and seat height, of the interior and external rear view mirrors as well as of the headrests can be undertaken simultaneously by depressing a push button.

Problems may occur in particular when the movement of the equipment components leads to safety-critical situations. This is the case, for example, when the sliding roof and the windows are displaced simultaneously into their closing position and a jamming danger for a person in or at the motor vehicle exists. In this case, it is necessary with the prior art circuit arrangements to actuate the associated switch in the corresponding manner. However, frequently finding the correct switch already offers difficulties. Frequently switches for other adjusting members are actuated. This causes the creation of a panic with the vehicle user or increases the already existing panic.

The present invention is concerned with the task to provide a circuit arrangement of the aforementioned type which causes to stop the equipment components in case of need in a simple and reliable manner.

The underlying problems are solved according to the present invention in that during the time interval of energization of the adjusting members the control units de-energize their adjusting members upon actuation of any selected switch even prior to reaching the end position of the equipment component.

In contrast to the prior art circuit arrangement, it is now no longer necessary to find the correct switch and to actuate the same in the correct manner. Already the actuation of any of the switches de-energizes all of the control units belonging to the respective functioning group and thus causes the equipment components to stop. Not only a panic of the vehicle user is avoided thereby but the possibility is also created to initiate the automatic movement sequences without close inspection. By reason of the safety which is provided by the possible strongly simplified stoppage of the equipment components, a safety feel also results for the vehicle user as regards the initiation of the automatic movement sequences and operations.

An improvement of the present invention resides in instantaneously de-energizing the equipment components upon actuation of one of the switches. In contrast to the further movement of the equipment component up to a safe distance from the end position which is possible by the actuation of this switch, this opens up the possibility to control also deliberately the stoppage of the equipment components. Desired intermediate positions of the equipment components can thus be also attained without any problems.

A further feature of the present invention resides in leaving the de-energized adjusting member in this condition for a delay period. It becomes possible therewith to eliminate a possibly existing critical condition without the danger of an unintentional re-energization of the adjusting member.

The adjusting member, however, may also be re-engageable during the delay period by means of the associated switch. It becomes possible thereby to intentionally displace again the equipment component prior to the expiration of the delay period and to undertake, for example, a movement of the equipment component in the opposite direction.

BRIEF DESCRIPTION OF THE DRAWING

These and other objects, features and advantages of the present invention will become more apparent from the following description when taken in conjunction with the accompanying drawing which shows, for purposes of illustration only, one embodiment in accordance with the present invention and wherein:

The single FIGURE is a schematic diagram of a circuit arrangement in accordance with the present invention.

DETAILED DESCRIPTION OF THE DRAWING

Referring now to the single FIGURE of the drawing, electrical adjusting members in the form of electric motors 5 and 6 are coordinated to several equipment components, for example, in the form of an electrically adjustable window 2 in a door 1 as well as an electrically adjustable sliding roof 3 for a roof opening 4 of the motor vehicle. The electric motors 5 and 6 are adapted to be engaged by means of manually actuatable switches 7 and 8 and displace the window 2, respectively, the sliding roof 3, into the open, respectively, closed position. For the sake of simplicity, only the circuitry for the movement of the electric motor 5 and 6 into the closed position is illustrated in the drawing.

In lieu of the individual adjustability of the window lifter 2, respectively, of the sliding roof 3, there exists the possibility to displace all of the associated equipment components into a predetermined position upon a command at will. In case of windows and sliding roofs as a group of associated component parts, this is, for example, the closed position thereof. With an electrically adjustable seat, this is the adjustment of the seating surface, of the backrest, and of the headrest into the preselected use position.

This common adjustment of equipment components which belong together, takes place with the aid of a central switch 9, by means of which control units belonging to the equipment components are activated in unison. The control units, in their turn, carry out automatically the movement of the associated equipment component into the end position. For that purpose, for example, the control unit 10, respectively, 10' for the electric motor 5, respectively, 6 consists of a trigger circuit 11, respectively, 11' with desired-actual-comparator 12, respectively 12' connected in the output thereof, that compares an actual value with a desired value and activates the electric motor 5, respectively, 6.

The electric motors 5 and 6 are additionally provided with a rotational position transmitter 13, respectively, 13' whose output signal is a measurement for the position of the window 2, respectively, of the sliding roof 3, and is fed back to the comparator 12, respectively 12'.

If the trigger element 11, respectively, 11' has been triggered by the switch 9, then it activates the comparator 12, respectively, 12' for such length of time until the latter receives an output signal of the transmitter 13, respectively, 13' that corresponds to the closed position of the window 2, respectively, of the sliding roof 3.

If for several similar types of equipment components, the movement thereof is initiated by the central switch 9, then critical conditions may occur during this movement. For example, the danger may exist that during the automatically proceeding movement sequence, a person or an object comes into the closing opening between the door 1 and the window 2. In this case, the possibility is to exist according to the present invention, to stop all of the electric motors, that is, in the illustrated embodiment, the electric motors 5 and 6 simultaneously and instantaneously. It suffices therefor to actuate one of the manual switches, i.e., in this case, the switch 7 or 8. These switches are connected in their output to the reset inputs of the trigger element 11, respectively, 11'. If one of the switches 7, respectively, 8 is actuated, then the trigger elements 11, respectively, 11' are reset instantaneously into the original condition and the electric motors 5, respectively, 6 are stopped. A possibly existing critical condition can then be eliminated without any problems.

It is also possible with a then de-energized electric motor 5 to actuate the equipment components individually. This takes place with the assistance of the individual switches, in this case the switch 7, respectively, 8 which continue to remain operable.

A delay element 14 may be arranged additionally in the current path between the reset inputs R of the trigger elements 11, respectively, 11' and the switches 7, respectively, 8 which becomes effective during the reset of the trigger elements and precludes a renewed engagement of the electric motors with the assistance of the central switch 9 for a predetermined delay time. Sufficient time exists therewith to eliminate the critical condition.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A circuit arrangement in motor vehicles, comprising equipment components, electric adjusting means for each of said equipment components, a plurality manually actuable switch means and control means which is operable upon initiation thereof to activate the adjusting means for the automatic displacement of the respective equipment component into an end position, the control means being operable to de-energize all of said adjusting means during the time interval of activation of the adjusting means by the control means upon actuation of any of the switch means even prior to reaching the end position of the equipment component.

2. A circuit arrangement according to claim 1, wherein one manually actuable switch means and one control means are individually associated with a respective equipment component and adjusting means.

3. A circuit arrangement according to claim 2, wherein the control means de-energize their respective adjusting means immediately upon actuation of a switch means.

4. A circuit arrangement according to claim 3, wherein the adjusting means is de-energized for a predetermined delay time.

5. A circuit arrangement according to claim 4, wherein the adjusting means is activatable during the delay period by means of the associated switch means.

6. A circuit arrangement according to claim 1, wherein the control means de-energize an adjusting means immediately upon actuation of its switch means.

7. A circuit arrangement according to claim 1, wherein the adjusting means is de-energized for a predetermined delay time.

8. A circuit arrangement according to claim 7, wherein the adjusting means is activatable during the delay period by means of an associated switch means.

9. A circuit arrangement according to claim 2, including a common switch means for initiating all of said control means.

* * * * *